No. 756,362. PATENTED APR. 5, 1904.
R. HAZELRIGG.
ROTARY ENGINE.
APPLICATION FILED JAN. 14, 1904.
NO MODEL. 4 SHEETS—SHEET 2.
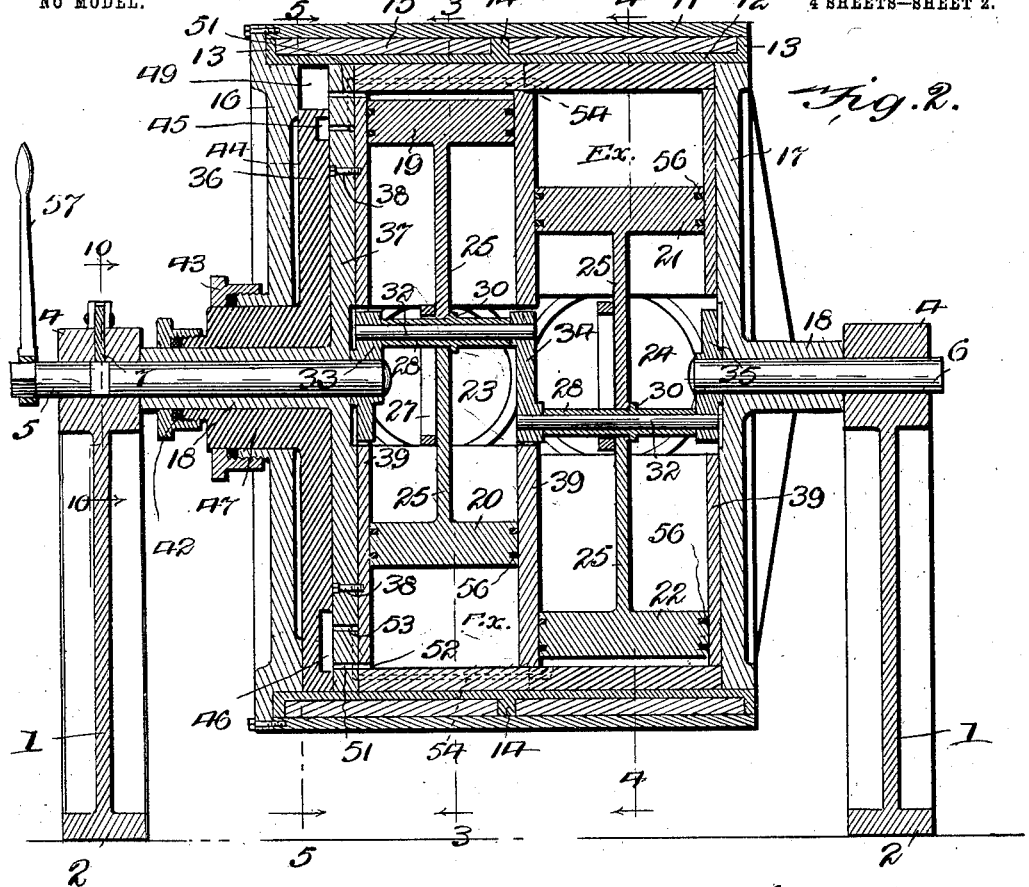
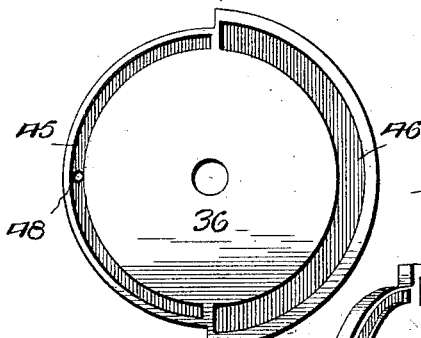
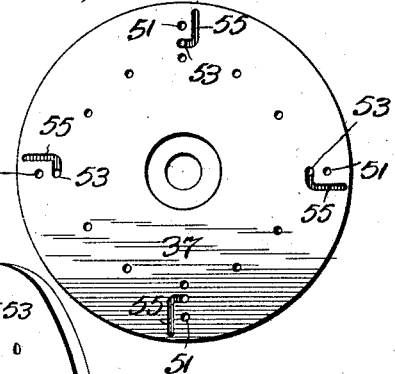
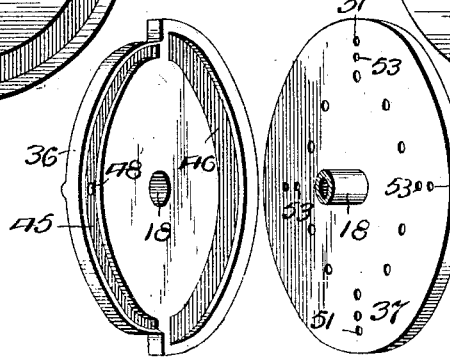
Inventor
Ross Hazelrigg
By
W. T. Fitzgerald
Attorney
Witnesses
F. C. Barry
J. A. Beckham No. 756,362. PATENTED APR. 5, 1904.
R. HAZELRIGG.
ROTARY ENGINE.
APPLICATION FILED JAN. 14, 1904.
NO MODEL. 4 SHEETS—SHEET 3.

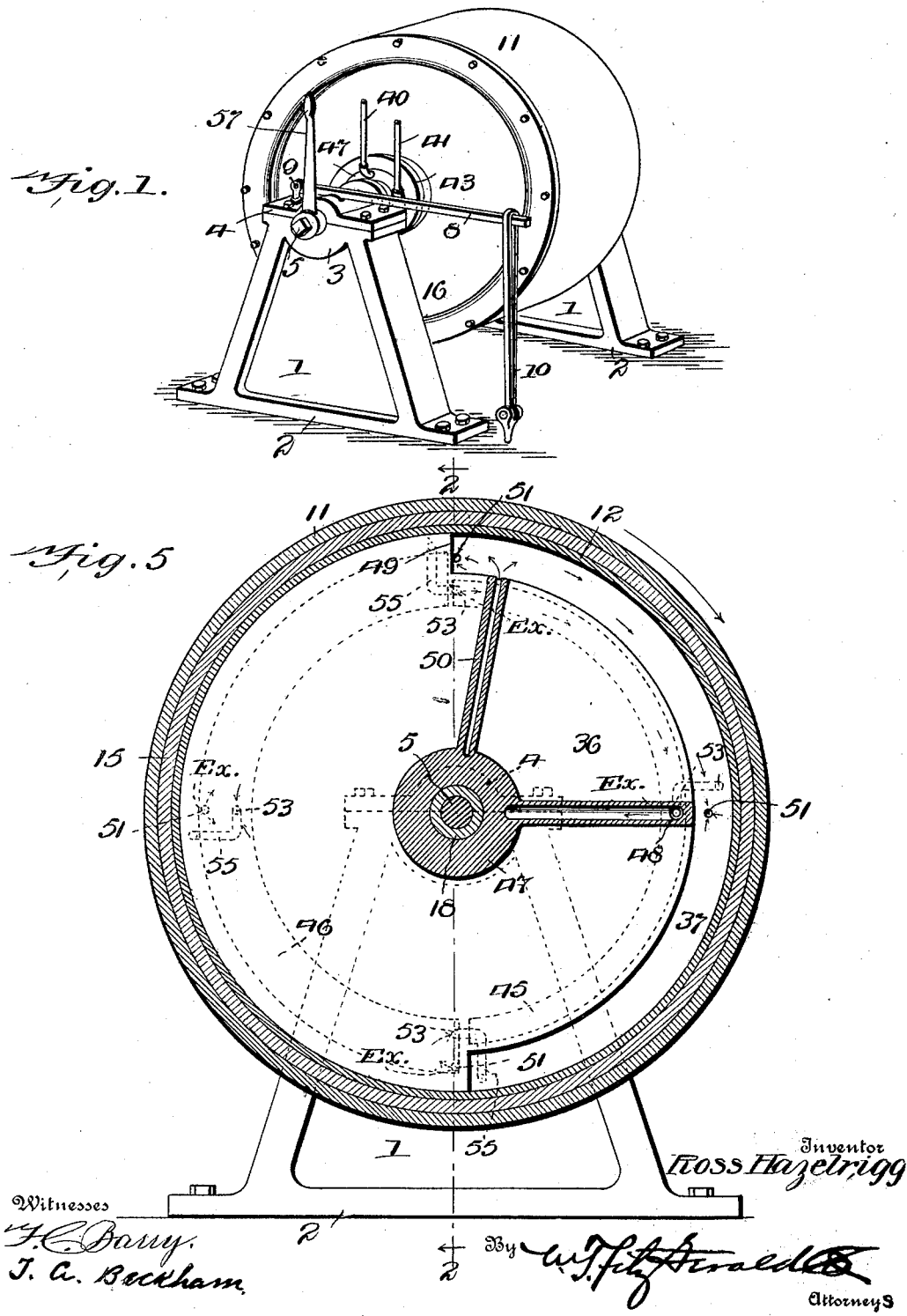

Witnesses
Inventor
Ross Hazelrigg

No. 756,362. PATENTED APR. 5, 1904.
R. HAZELRIGG.
ROTARY ENGINE.
APPLICATION FILED JAN. 14, 1904.
NO MODEL.
4 SHEETS—SHEET 4.
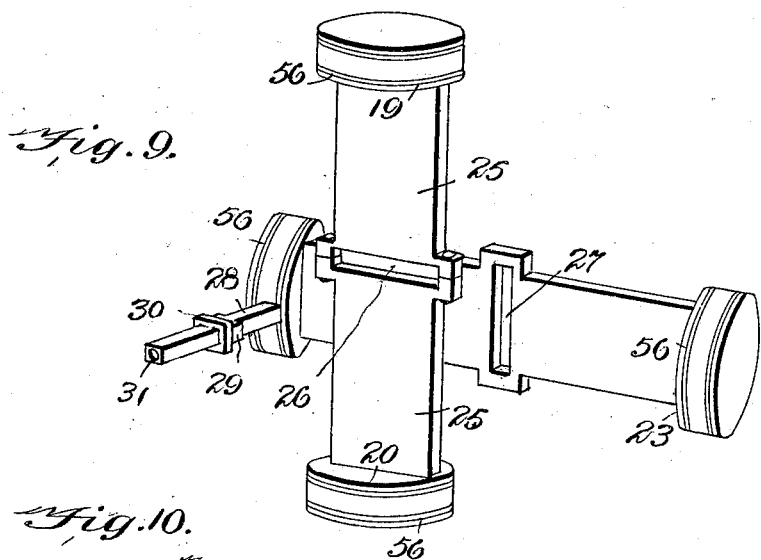
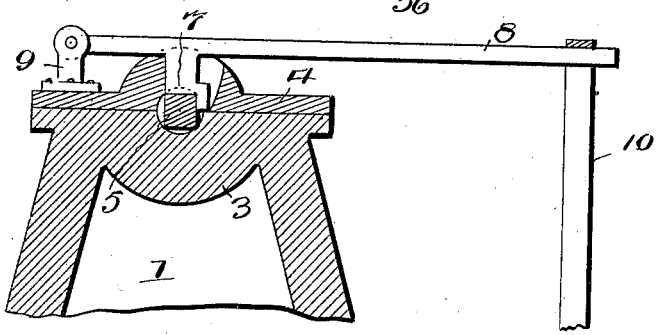
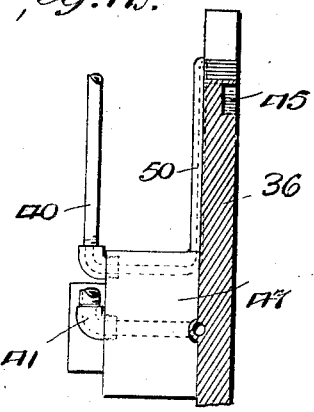
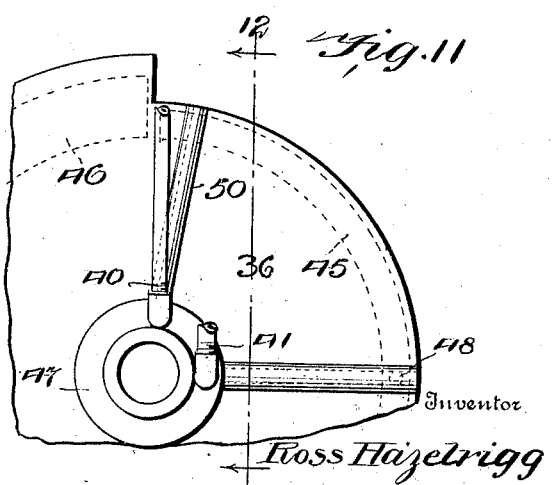
Inventor
Ross Hazelrigg No. 756,362. Patented April 5, 1904.

UNITED STATES PATENT OFFICE.

ROSS HAZELRIGG, OF COTTAGEGROVE, OREGON.

ROTARY ENGINE.

SPECIFICATION forming part of Letters Patent No. 756,362, dated April 5, 1904.

Application filed January 14, 1904. Serial No. 189,010. (No model.)

*To all whom it may concern:*

Be it known that I, ROSS HAZELRIGG, a citizen of the United States, residing at Cottagegrove, in the county of Lane and State of Oregon, have invented certain new and useful Improvements in Rotary Engines; and I do hereby declare the following to be a full, clear, and exact description of the invention, such as will enable others skilled in the art to which it appertains to make and use the same.

My invention relates to engines, and more particularly to that variety designated "rotary" engines, and to that particular class of rotary engines wherein the steam-chest containing the actuating-pistons rotates upon its support and its periphery is utilized as a belt-wheel; and my invention consists of certain novel features of combination and construction of parts, as will be hereinafter clearly set forth, and pointed out in the claim.

The prime object of my invention, among others, is to provide a rotary engine of the character specified which will utilize the steam to the greatest possible extent by exhausting and condensing the same into coöperation with an adjacent piston, whereby it may be a second time used.

A further object of my invention is to provide simple, though reliably efficient, means for instantly reversing the movement of the engine and driving the same in either direction.

Other objects and advantages will be hereinafter made clearly apparent, reference being had to the accompanying drawings, which are made a part of this application, and in which—

Figure 3:
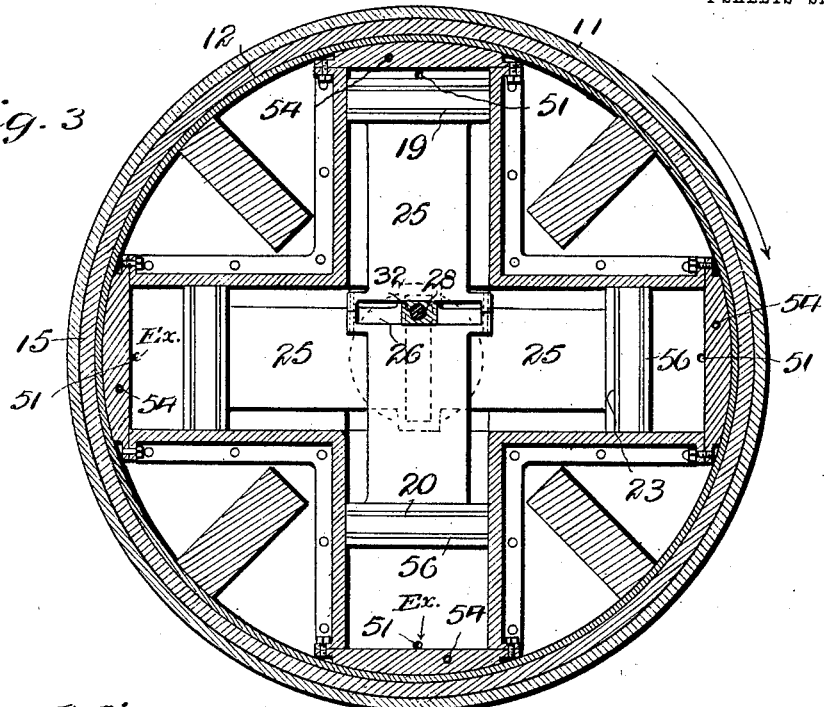
Figure 4:
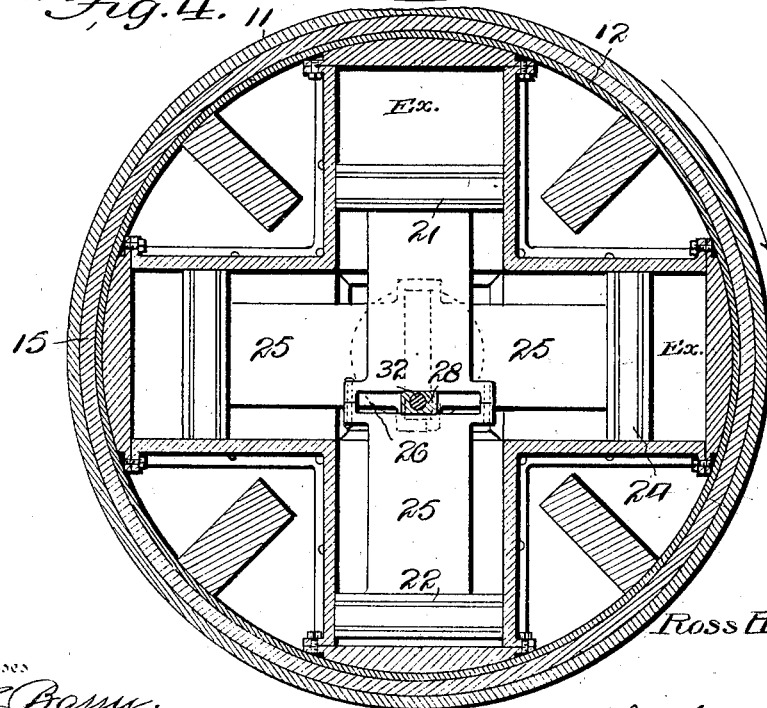

Figure 1 shows a perspective view of my invention complete, ready for use. Fig. 2 is a central vertical section of Fig. 1. Fig. 3 is a sectional view of Fig. 2 on line 3 3. Fig. 4 is a sectional view of Fig. 2 on line 4 4. Fig. 5 is a sectional view of Fig. 2 on line 5 5. Fig. 6 is a detail plan view of the inner face of the stationary member comprising the feed and exhaust ports. Fig. 7 is a detail plan view of the inner face of the rotating member coöperating with the stationary member shown in Fig. 6. Fig. 8 is a detail in perspective showing the inner face of the member illustrated in Fig. 6 and also showing the outer face of the member illustrated in Fig. 7 when said members are ready to be disposed in their coöperative position. Fig. 9 is a detail perspective view showing the four pistons employed by me and also showing the connecting coöperating pin. Fig. 10 is a sectional view taken on line 10 10 of Fig. 2. Fig. 11 is a detail view in elevation of a portion of the member illustrated in Fig. 6, showing the outer side thereof. Fig. 12 is a sectional view of Fig. 11 on line 12 12.

For convenience of reference to the details and coöperating accessories of my invention numerals will be employed, the same numeral applying to a similar part throughout the several views.

In carrying out my invention I provide suitable supporting standards or framework, as indicated by the numeral 1, which may be of the usual or any preferred construction and integrally formed with or otherwise connected to a suitable base-section 2, said standards being provided upon their upper ends with the connecting horizontal member 3, provided with a suitable bearing-seat and with a locking-cap 4. Within the seat thus or otherwise provided I mount the outer ends of the supporting-shafts 5 and 6, said shafts being held against rotation in any desired way, preferably by means of the depending branch 7, carried by the lever 8, which latter is pivotally connected to a suitable bracket 9, while the outer end thereof may be engaged in any preferred way, as by means of the keeper-strap 10 or equivalent thereof.

It will be understood that the shaft of my engine does not rotate, but is normally held stationary, leaving the outer casing of my engine, as hereinbefore mentioned, free to turn upon its support in a manner hereinafter set forth. The outer casing comprises the cylindrical member 11, the periphery of which is designed to receive the belt extending to the machinery to be driven.

It will be understood that the cylindrical portion may be made in any desired way, but is preferably formed by having the inner coöperating band 12 provided on each end with the outwardly-directed flange 13 and with a middle rib 14 to impart rigidity and strength thereto, it being understood that the annular spaces left between said rib and flanges may be filled with suitable material, as indicated by the numeral 15. I also provide the cylinder-heads 16 and 17, each having an integral hub-section or outwardly-extending sleeve, as indicated by the numeral 18, said sleeves fitting snugly around and are designed to rotate upon the shaft-sections 5 and 6.

Within the cylinder or steam-chest thus or otherwise provided I locate the working or actuating parts of my engine, said parts consisting of preferably eight reciprocating coöperating pistons, each of which I have for convenience designated, so far as illustrated, by separate reference-numerals 19, 20, 21, 22, 23, and 24. Said pistons are disposed in groups of four, or two pairs in each group, each pair reciprocating in parallel planes, the next group of four also arranged in pairs and reciprocating in parallel planes at right angles to the planes of reciprocation of the other group. Each piston is provided with an inwardly-directed rod or power-communicating branch 25, the branches of two pistons which reciprocate in the same plane being integrally formed with each other or otherwise connected, whereby transverse slots will be formed, which for convenience of description I have designated in Fig. 9 by the numerals 26 27, the slot 27 being designed to receive the squared portion of the connecting-link 28, while the slot 26 receives the portion 29, a suitable collar 30 being also formed upon the link 28 to more reliably hold the slots in their proper relative position upon said link.

The member 28, which, as will be observed, is squared in cross-section, is provided with a tubular bore 31, designed to receive and rotate upon the rod 32, there being two of said rods, as will be observed by reference to Fig. 2. There are also two in number of the members 28, and said rods 32 and members 28 are designed to form a compound crank-like union between the shaft-sections 5 and 6 through the mediation of the crank-arms 33, 34, and 35, and since the shaft-sections 5 are locked against rotation by the means or the equivalent thereof hereinbefore described it will be seen that the casing itself will be rotated through the mediation of the plurality of pistons thus placed in coöperation with the compound crank-sections, which, as before stated, comprise the members 28 and 22, placed in coöperation with said pistons and with the shaft-sections, as before explained.

It of course becomes desirable and important to provide means for introducing live steam into coöperation with the pistons and for conveying the exhaust-steam out of the way of a driven piston, and I therefore now call attention to the coöperating feed and exhaust ports which I have provided by means of the members 36 and 37, the latter being connected in any preferred way, as by the set-screws 38, to the piston-carrying frame, which latter comprises the members 39, provided with suitable openings for the reciprocation of all the pistons, said parts 39 being connected to and designed to rotate with the exterior portion of the cylinder and with the cylinder-heads 16 and 17, as will be obviously necessary. The port member 36 remains stationary, being held in such position by the feed and exhaust pipes, respectively designated by the numerals 40 and 41 in Fig. 1, it being understood that suitable stuffing-boxes, as indicated by the numerals 42 and 43, must also be provided to prevent leakage of steam. To reduce the friction to a minimum, a suitable clearance-space 44 is provided between the cylinder-head 16 and the port member 36, as clearly shown in Fig. 2. The port member 36 is provided upon its inner face with the annular semicircular grooves or recesses 45 and 46 and upon its outer side with the hub-section 47, which latter fits snugly around the sleeve 18 and is provided, as heretofore explained, with a stuffing-box 42, it being understood that the cylinder-head 16 is thus provided with a bearing upon the hub 47. Coöperating with the inner face of the port member 36 is the outer face of the rotating member 37, said outer face being illustrated in Fig. 8 ready to be placed into coöperative relationship with said port member. The groove or recess 45, it will be observed, is placed in communication with the exhaust-port 48, which communicates by proper piping or duct with the exhaust-pipe 40.

By reference to Figs. 2, 6, and 8 it will be seen that the upper half of the peripheral edge of the member 36 is entirely cut away, thereby providing the semi-annular chamber 49 between the cylinder-head 16 and the member 37, and I utilize this chamber thus provided for conveying live steam, as by means of the feeding-duct 50, said duct discharging the live steam into the semi-annular space 49 and thence through the port 51 into position to drive the piston 19 inward against the member 28, it being understood that the next quarter-turn of the casing upon its supporting-shafts will bring the feeding-ports into position to initially act upon and drive the next pair of pistons disposed in a plane at right angles to the first above described.

In Fig. 5 I have illustrated the port 51 (it being understood that there are a number of said ports) in such position relative to the port member 36 to begin receiving steam, and as the member 37 is turned in the direction indicated by the arrow said port 51 will continue to receive live steam until it shall have traveled around the extreme opposite end of the semi-annular space 49 and that when said port shall have reached the half-way point in said semi-annular space it will be in position to initially supply with steam the piston directly opposite said port. When the piston 19 is initially receiving steam, the piston 20 begins to exhaust, said exhaust taking place through the port, which for convenience of description I have designated 52, corresponding, of course, to the piston 51 in respect to the location thereof; but it will be observed that when the port 51 is in communication with the semi-annular chamber 40 the port 52 is in communication with the semi-annular recess 46, permitting the steam to pass into said recess and thence through the port 53 and through the duct (indicated by dotted lines) 54 into coöperation with the piston 22 at the initial movement thereof, thereby utilizing the steam exhausting from in front of the piston 20 for the purpose of driving the piston 22, this compound use of the steam being very desirable, and therefore making the pistons 19 and 20 the main pistons and the pistons 21 and 22 the auxiliary pistons, inasmuch as each of the last-named pistons come successively into position to receive the exhaust-steam from any advance of the pistons 19 and 20 through the duct 54, it being understood that the other group of pistons, arranged at right angles to the group just referred to, is similarly actuated and driven.

By reference to Fig. 7 it will be observed that the angular recess 55 is in proper position to form the connecting-link between the port 53 and the duct 54.

By reference to Fig. 2 it will be observed that annular recesses are provided in the edge of each of the pistons, said recesses being filled with suitable packing material, as indicated by the numeral 56, to prevent leakage of the steam.

By the construction just described it is obvious that by turning the shaft-sections 5 and 6, which are connected together in a manner hereinbefore set forth, said actuation thereof being accomplished by means of the controlling-lever 57, the engine may be instantly reversed, it of course being necessary to first release the lever 8 from engagement with the angular part of the shaft 5.

By the construction just described it will be seen that while the supporting shafts or journals are normally held against rotation the steam-chest or entire casing, within which the driving-pistons are operatively mounted, is left free to rotate and to drive any belt, sprocket-chain, or the like with which the peripheral face of the casing may be placed in coöperative relationship. It is furthermore obvious that the driving-wheel may, if desired, be placed upon the hub 18 surrounding the shaft-section 6.

By reference to the foregoing description, considered in connection with the drawings, it will be seen that I have provided a comparatively simple and reliably efficient motor of the character specified and that suitable provision is made for introducing live steam and providing for the necessary exhaust thereof after such steam has been twice used, first upon the main and last upon the auxiliary piston adjacent thereto, as clearly set forth, and it is further obvious that the various parts of my invention may be made any desired size and of any suitable material deemed best adapted for the purpose to which the motor is to be applied, and while I have described the preferred combination and construction of parts I desire to comprehend in this application all such substantial equivalents and substitutes as may be considered to fall fairly within the scope of my invention.

What I claim as new, and desire to secure by Letters Patent, is—

The herein-described rotary engine comprising a suitable support; shaft-sections 5 and 6 operatively connected together by a compound crank; a suitable casing rotatably mounted upon said shaft-sections; reciprocating pistons operatively connected to said cranks; means to hold the shaft-sections against rotation whereby when the pistons are reciprocated the force thereof will be directed to the rotation of the casing to drive the belting or other power-communicating device connected thereto, and a port member 36 held stationary by the exhaust and feed pipes whereby the contiguous parts of the casing will be left free to rotate, said port member having the exhaust and feeding grooves or recesses 45 and 46, respectively, and suitable ports leading into the feeding-recess and into successive communication with the pistons and additional ports conveying the exhaust-steam from the initially-actuated pistons to the auxiliary pistons adjacent thereto and suitable exhaust-ports for the final exhaust, all substantially as specified and for the purpose set forth.

In testimony whereof I have signed my name to this specification in the presence of two subscribing witnesses.

ROSS HAZELRIGG.

Witnesses:
    HARRY K. METCALF,
    JOHN ROBINSON.